(12) United States Patent
Lee et al.

(10) Patent No.: US 7,262,896 B2
(45) Date of Patent: Aug. 28, 2007

(54) POLYGONAL MIRROR UNIT, LIGHT SCANNING UNIT, AND IMAGE FORMING APPARATUS EMPLOYING THE SAME

(75) Inventors: Sang-hoon Lee, Seongnam-si (KR); Hyun-surk Kim, Suwon-si (KR)

(73) Assignee: Samsung Electronics, Co., Ltd., Suwon-si, Gyeonggi-do (KR)

(*) Notice: Subject to any disclaimer, the term of this patent is extended or adjusted under 35 U.S.C. 154(b) by 151 days.

(21) Appl. No.: 11/211,685

(22) Filed: Aug. 26, 2005

(65) Prior Publication Data
US 2006/0061849 A1  Mar. 23, 2006

(30) Foreign Application Priority Data
Sep. 21, 2004  (KR) .............. 10-2004-0075484

(51) Int. Cl.
*G02B 26/08* (2006.01)
(52) U.S. Cl. .................... 359/216; 347/261
(58) Field of Classification Search ........ 359/216–218, 359/855; 347/261
See application file for complete search history.

(56) References Cited
U.S. PATENT DOCUMENTS
6,424,447 B1* 7/2002 Kaneko et al. ............. 359/216
6,730,273 B1  5/2005 Ramos
2001/0007507 A1* 7/2001 Iimura ...................... 359/241

FOREIGN PATENT DOCUMENTS

| JP | 5-72495 | 3/1993 |
|---|---|---|
| JP | 9-179197 | 7/1997 |
| JP | 11-138822 | 5/1999 |
| JP | 11-161122 | 6/1999 |
| JP | 2001-249592 | 9/2001 |
| JP | 2002-284385 | 10/2002 |
| JP | 2003-149580 | 5/2003 |
| JP | 2003-167110 | 6/2003 |
| KR | 10-2004-0022944 | 3/2004 |

* cited by examiner

*Primary Examiner*—Euncha P. Cherry
(74) *Attorney, Agent, or Firm*—Roylance, Abrams, Berdo & Goodman, L.L.P.

(57) ABSTRACT

A polygonal mirror unit is adapted to prevent contamination using a photocatalyst, a light scanning unit, and an image forming apparatus employing the polygonal mirror. The polygonal mirror unit is designed to prevent contamination of organic materials on a reflective surface. The polygonal mirror unit includes a driving device and a polygonal mirror having a reflective surface that is rotated by the driving device and deflects and scans an incident beam. The polygonal mirror has a main body with a plurality of reflective surfaces and photocatalytic layers formed on the plurality of reflective surfaces. The photocatalytic layers are activated by an incident beam of a predetermined wavelength to decompose organic materials on the reflective surfaces.

29 Claims, 6 Drawing Sheets

POLYGONAL MIRROR UNIT, LIGHT SCANNING UNIT, AND IMAGE FORMING APPARATUS EMPLOYING THE SAME

BACKGROUND OF THE INVENTION

This application claims the benefit of Korean Patent Application No. 10-2004-0075484, filed on Sep. 21, 2004, in the Korean Intellectual Property Office, the disclosure of which is incorporated by reference herein in its entirety.

1. Field of the Invention

The present invention relates to a polygonal mirror unit for scanning a beam emitted from a light source onto a surface to be scanned, a light scanning unit, and an image forming apparatus employing the same. More particularly, the invention is directed to a polygonal mirror unit constructed to prevent contamination using photocatalyst, a light scanning unit, and an image forming apparatus employing the polygonal mirror and the light scanning unit.

2. Description of the Related Art

In general, a light scanning unit is used in a laser printer, a digital copier, a barcode reader, a facsimile, or the like to produce a latent image on an exposed object through main scanning by a beam deflector and subscanning by rotation of the exposed object.

Referring to FIG. 1, a typical light scanning unit includes a light source 1 that produces and emits a beam, a beam deflector 5 that deflects the beam emitted by the light source 1 to be scanned onto an exposed object 9, and an f-θ lens 7 that corrects an error contained in the beam deflected by the beam deflector 5. In addition, a collimating lens 2 that collects the divergent beam from the light source 1 and a cylindrical lens 3 that shapes the beam are disposed in an optical path between the light source 1 and the beam deflector 5.

The beam deflector 5 includes a driving source 5a and a rotating polygonal mirror 5b rotated by the driving source 5a. Accordingly, a scanning direction is determined depending on the reflection direction of a beam that changes as the polygonal mirror 5b rotates. Thus, when the polygonal mirror 5b rotates clockwise, the beam incident on the polygonal mirror 5b is scanned onto the exposed object 9 in main scanning direction as indicated by an arrow A.

Meanwhile, there is a need to prevent contamination of the polygonal mirror 5b with foreign materials in the light scanning unit configured as described above because the contamination significantly degrades scanning performance.

As a solution to prevent this contamination, Japanese Patent Publication No. hei 5-72495 for A Laser Beam Printer published on Mar. 26, 1993 discloses a cover for preventing contamination on a polygonal mirror. The cover is separately located within an optical box containing a light scanning unit and encloses the polygonal mirror. Through a holder, a glass is fitted into a groove formed in one side of the cover and through which a beam enters and exits. The cover protects the surface of the polygonal mirror from contamination during operation.

However, due to the use of a separate cover for prevention of contamination the manufacturing costs are high, and an assembly manufacturing process is very complicated. While the cover prevents inflow of external air, the possible presence of contaminants in air flowing into the work area during assembling reduces the effect of the cover, and there is a high risk of contamination due to oil that is finely sprayed from a polygonal mirror driving motor. Furthermore, the use of a cover may only retard contamination but cannot completely eliminate the risk of contamination.

SUMMARY OF THE INVENTION

The present invention provides a polygonal mirror designed to prevent contamination of its reflective surfaces by decomposing contaminants with a photocatalyst, a polygonal mirror unit, a light scanning unit, and an image forming apparatus employing the polygonal mirror.

According to an aspect of the present invention, there is provided a polygonal mirror designed to prevent contamination of a reflective surface. The polygonal mirror includes a main body with a plurality of reflective surfaces and photocatalytic layers that are formed on the plurality of reflective surfaces. The layers are activated by an incident beam of a predetermined wavelength to decompose organic materials.

According to another aspect of the present invention, a polygonal mirror unit is provided to prevent contamination on a reflective surface. The polygonal mirror unit includes a driving source and a polygonal mirror that is rotated by the driving source to deflect and scan an incident beam. The polygonal mirror comprises a main body with a plurality of reflective surfaces and photocatalytic layers that are formed on the plurality of reflective surfaces and are activated by an incident beam of a predetermined wavelength to decompose organic materials. The organic materials are typically contaminants on the reflective surfaces. Examples of contaminants include oil and other organic materials that can be transferred from other parts of the apparatus onto the reflective surface.

According to another aspect of the present invention, there is provided a light scanning unit including: a light source emitting a beam of a first wavelength; a driving device providing a rotational force; and a polygonal mirror that is rotated by the driving device and deflects and scans the beam of the first wavelength emitted by the light source. The polygonal mirror includes a main body with a plurality of reflective surfaces and photocatalytic layers that are formed on the plurality of reflective surfaces and are activated by an incident beam of a predetermined wavelength to decompose organic materials. The organic materials are typically contaminants formed on the reflective surfaces.

According to another aspect of the present invention, there is provided an image forming apparatus including: a developing unit; a light scanning unit including a light source emitting a beam of a first wavelength, a driving device providing a rotational force, and a polygonal mirror that is rotated by the driving device and deflects and scans the beam of the first wavelength emitted by the light source; a transfer unit corresponding to the developing unit and transferring the image formed by the developing unit to a print medium; and a fusing unit fusing the transferred image on the print medium. The polygonal mirror comprises a main body with a plurality of reflective surfaces and photocatalytic layers that are formed on the plurality of reflective surfaces and are activated by an incident beam of a predetermined wavelength to decompose organic materials.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
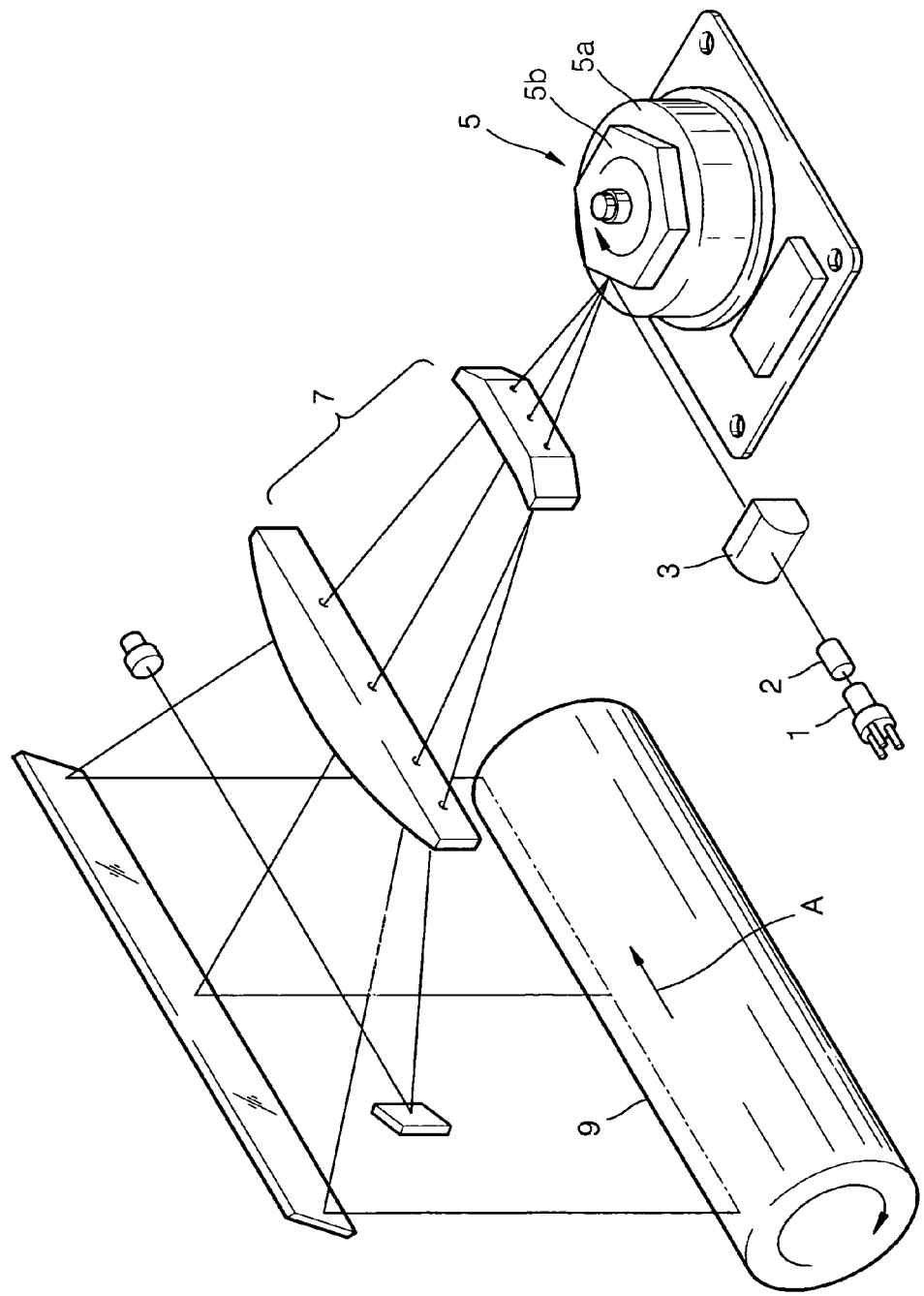
FIG. 1 is a schematic perspective view showing optical arrangement of a typical prior art light scanning unit.
Figure 2:
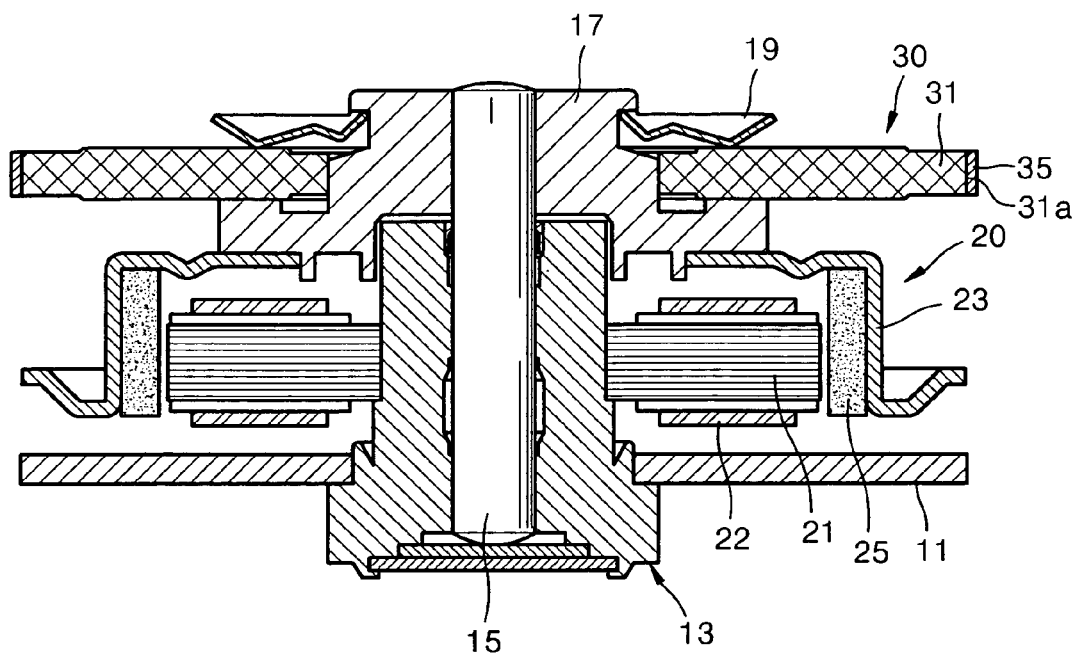
FIG. 2 is a cross-sectional view of a polygonal mirror unit according an embodiment of the present invention.

Referring to FIG. 2, a polygonal mirror unit according to an embodiment of the present invention includes a driving source 20 providing a rotational force and a polygonal mirror 30 rotatably installed with respect to the driving device 20. In order to rotatably support the polygonal mirror 30 with respect to the driving device 20, the polygonal mirror unit further includes a bearing 13 fixed to a base 11, a rotating axle 15 rotatably installed in the bearing 13 and rotating about a fixed axis, and a rotor frame 17 combined with the rotating axle 15.

The driving device 20 is comprised of a stator core 21, a rotor housing 23, and a magnet 25. The stator core 21 is fixedly attached to the outer circumference of the bearing 13 and contains a wound coil 22. The rotor housing 23 is combined with the rotor frame 17 and surrounds the stator core 21. The magnet 25 is installed in the rotor housing 23.

Figure 3:
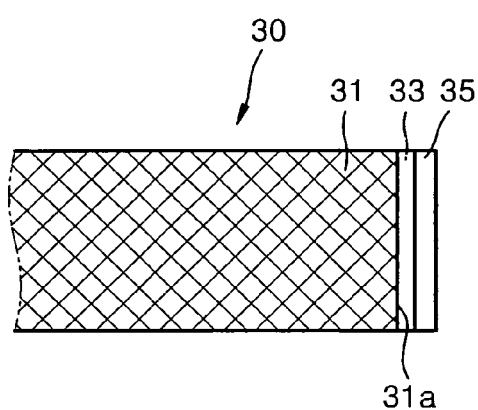
FIG. 3 is a cross-sectional view of a portion of the polygonal mirror shown in FIG. 2.

Referring to FIGS. 2 and 3, the polygonal mirror 30 is rotated by the driving device 20 so as to deflect and scan an incident beam and includes a main body 31 with a plurality of reflective surfaces 31a and photocatalytic layers 35 formed on the plurality of reflective surfaces 31a. The reflective surfaces 31a are formed on the polygonal mirror 30. The polygonal mirror 30 is assembled with the outer perimeter of the rotor frame 17 and fixed by a separate fixing element.

The photocatalytic layer 35 is activated by an incident beam of a predetermined wavelength to decompose organic materials, thus preventing contamination of the reflective surface 31a. To prevent and/or remove the contamination of the reflective surface 31a, the photocatalytic layer 35 is made from a material that is activated by the laser beam that is emitted by a light source in a light scanning unit to generate a hydroxyl radical (—OH) upon exposure to the light source. Examples of photocatalytic materials include semiconductor metal oxides such as $TiO_2$, $WO_2$, or $SrTiO_2$ and sulphur compound such as CdS or $MoS_2$.

The reflective surfaces of the polygonal mirror 30 typically collect contaminants that can interfere with the function of the reflective surfaces. The contaminants include organic components that can form a thin film on the reflective surfaces. The photocatalytic layer is activated by the incident beam of light to release reactive components, such as oxidizing agents, and preferably free radicals in an amount to decompose the organic components of the contaminants.

The polygonal mirror may further include a corrosion preventive layer 33 that is interposed between the main body 31 and the photocatalytic layer 35 and prevents the corrosion of the main body 31 supporting the photocatalytic layer 35. The corrosion preventive layer 33 is made of a material such as $SiO_2$, which will not chemically react with the metal oxide or sulphur compound of the photocatalytic layer.

The addition of an anti-corrosion material to the photocatalytic layer 35, can also protect the reflective surface 31a against corrosion without the use of the corrosion preventive layer 33.

Figure 4:
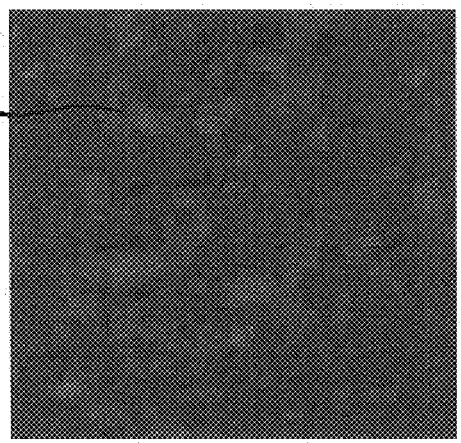
FIG. 4 is a scanning electron microscope (SEM) photograph showing the degree of contamination on a reflective surface of a polygonal mirror without a photocatalytic layer.
Figure 5:
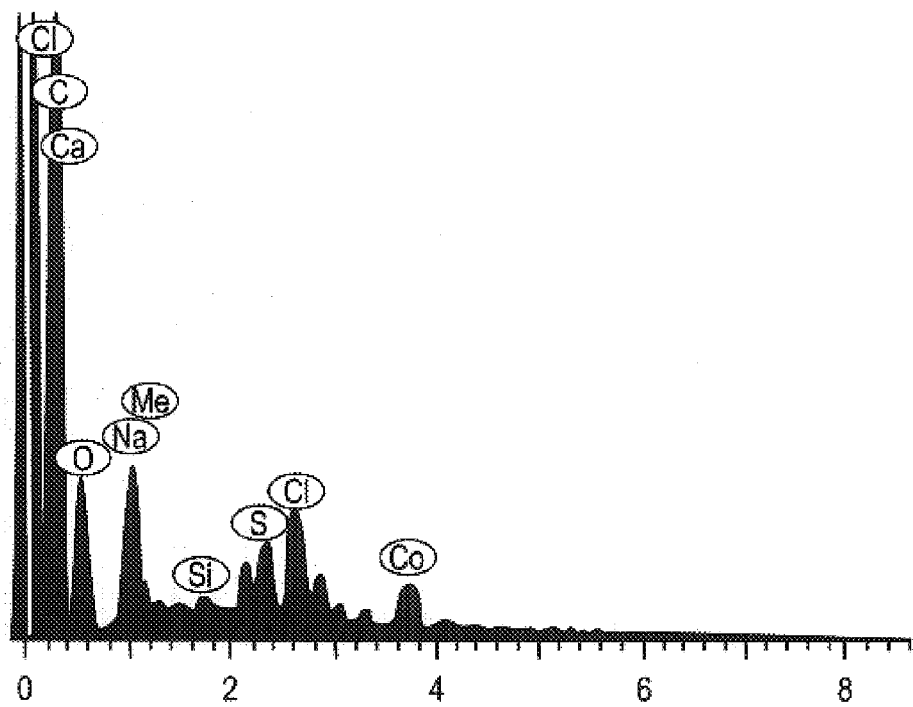
FIG. 5 is a graph showing the result of analysis of the component composition of contaminants shown in FIG. 4.

The degree of contamination of a polygonal mirror and contaminant composition analyzed as well as the principle of photocatalysis will now be described with reference to FIGS. 4 through 6. FIG. 4 is a scanning electron microscope (SEM) photograph showing the degree of contamination on a reflective surface of a polygonal mirror without a photocatalytic layer. As is evident from FIG. 4, the reflective surface is contaminated with foreign materials due to impact of the surrounding environment of a light scanning unit. FIG. 5 and Table 1 show the component composition of the contaminants based on an analysis of the composition of the contaminants analyzed.

TABLE 1

| Component | Weight % | Atom % |
|---|---|---|
| C | 61.93 | 70.87 |
| O | 28.29 | 24.30 |
| Na | 4.60 | 2.75 |
| Mg | 0.34 | 0.19 |
| Si | 0.33 | 0.16 |
| S | 0.80 | 0.34 |
| Cl | 2.40 | 0.93 |
| Ca | 1.31 | 0.45 |
| Total | 100.00 | |

As is evident from FIG. 5 and Table 1, the most serious and abundant contaminant is carbon (C), which is a kind of organic material. To remove the contaminants from the reflective surface, a polygonal mirror according to the present invention contains a photocatalytic layer constructed as above in the main body 31 as shown in FIG. 2.

Figure 6:
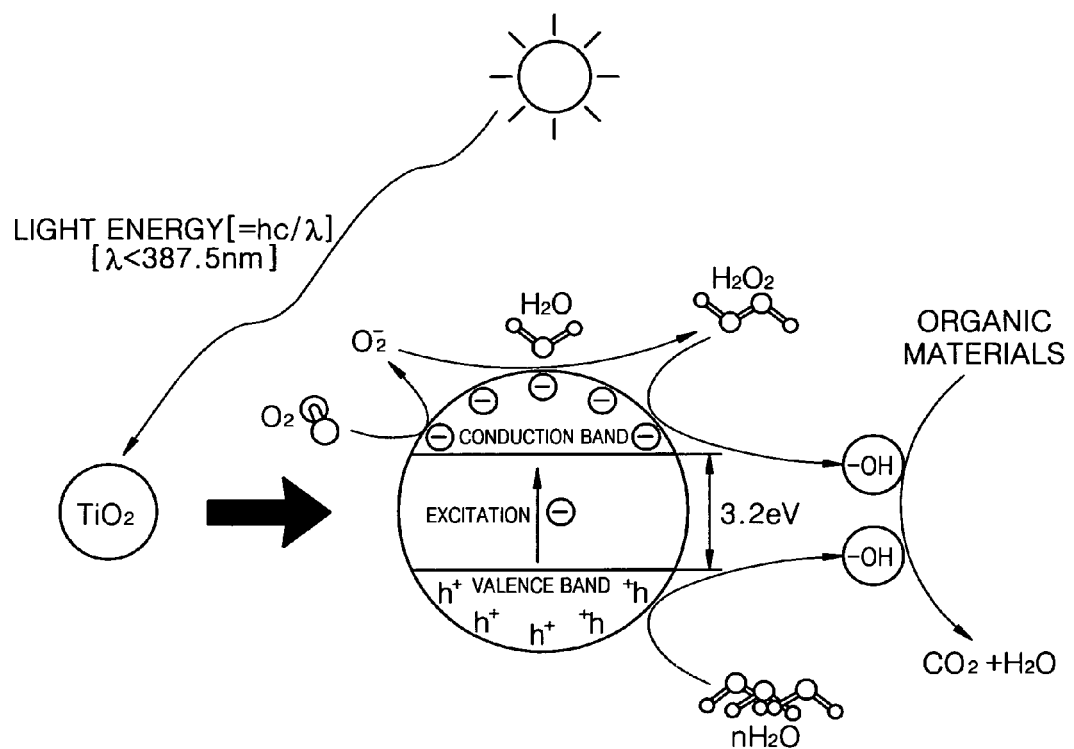
FIG. 6 is a diagram explaining the principle of photocatalysis.

FIG. 6 shows a process of removing contaminant components when a photocatalyst is made of a semiconductor metal oxide $TiO_2$. Referring to FIG. 6, light of a predetermined wavelength, for example, a wavelength shorter than 387.5 nm excites electrons from a valance band to a conduction band. As a result of this energy change, the electrons and holes are created in the conduction and valence bands of $TiO_2$, respectively. The electrons and holes are used to form oxygen ($O_2$) in the air, water ($H_2O$), and —OH radicals. The —OH radicals are powerful oxidizer and decompose the carbon-containing organic materials into $CO_2$ and $H_2O$.

Even when contamination of the polygonal mirror 30 including the photocatalytic layer 35 occurs due to organic materials, it is possible to decompose and remove the organic materials of the contaminants by forming —OH radicals upon emission of light on the photocatalytic layer 35. Thus, contamination of the polygonal mirror 30 can be eventually prevented without the need for separate components.

Figure 7:
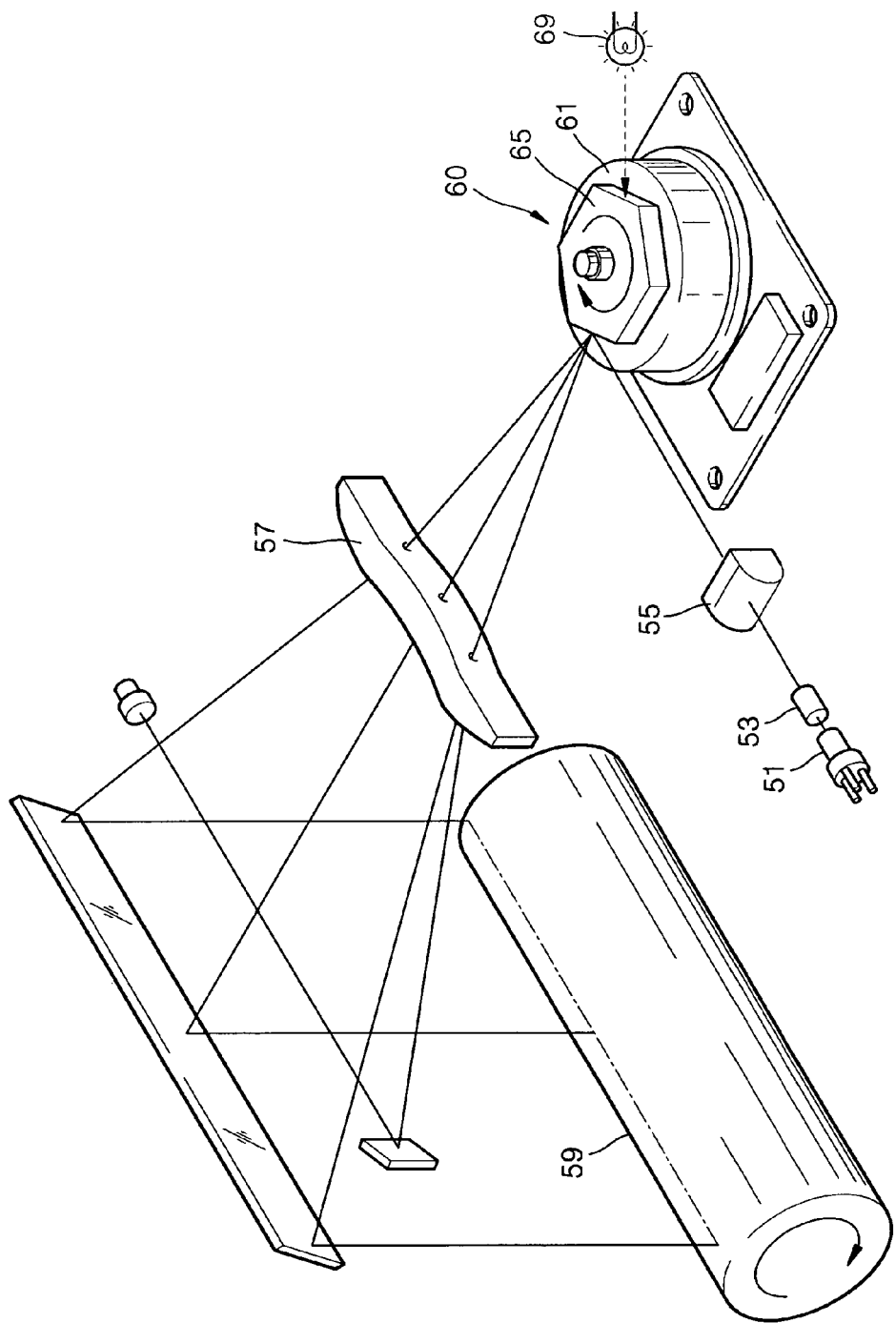
FIG. 7 is a schematic perspective view of a light scanning unit according to an embodiment of the present invention.

FIG. 7 is a perspective view of a light scanning unit according to an embodiment of the present invention. Referring to FIG. 7, the light scanning unit includes a light source 51 that produces and emits a laser beam and a polygonal mirror unit 60 that deflects the beam emitted by the light source 51 so as to be scanned onto an exposed object 61. The light source 51 is a semiconductor laser that emits a beam of a first wavelength. The polygonal mirror unit 60 includes a driving source 61 that provides a rotational force and a polygonal mirror 65 that is rotated by the driving source 61 and deflects and scans the beam of the first wavelength emitted by the light source 51. The polygonal mirror 65 includes a main body with a plurality of reflective surfaces and photocatalytic layers that are formed on the plurality of reflective surfaces and activated by an incident beam of a predetermined wavelength to decompose an organic material.

The photocatalytic layer can be made from a material that is activated by the beam of the first wavelength, e.g., a 780 nm wavelength laser beam, emitted by the light source 51 to generate —OH radicals. Examples of this material include semiconductor metal oxide such as $TiO_2$, $WO_2$, or $SrTiO_2$ and sulphur compound such as CdS or $MoS_2$.

The photocatalytic layer may be made of other materials that can be activated by a beam of a second wavelength in a band ranging from 300 to 400 nm. In this case, an activation light source 69 emitting the beam of the second wavelength may be disposed around the polygonal mirror 65 in a different location from primary light source 51. The activation light source 69 emits a beam at times other than when the light scanning unit performs beam scanning such that a scan line is not affected by the illumination. The activation light source 69 can be activated at selected predetermined time intervals and for time periods sufficient to remove or decompose any organic contaminants that may form on the surface of the reflective surface.

Since the construction, and operation, and effect of the polygonal mirror 65 are substantially the same as those of the polygonal mirror (30 of FIG. 2) described with reference to FIGS. 2 and 3, detailed descriptions thereof will not be given. It is well known that the length of a wavelength activated depends on the properties of a material forming the photocatalytic layer, so a detailed description of the relationship between them will not be given.

The light scanning unit may further include an f-θ lens 57 that is disposed in an optical path between the polygonal mirror unit 60 and an exposed object 59 and corrects the beam deflected by the polygonal mirror unit 60 at different magnifications for the main scanning direction and subscanning direction so that the corrected beam is focused onto the exposed object 59. The subscanning direction refers to the direction that the exposed object 59 rotates, and the main scanning direction refers to an axial direction of the exposed object 59, i.e., the direction in which the beam is deflected by the polygonal mirror 65. The light scanning unit may further include a collimating lens 53 and at least one cylindrical lens 55 in an optical path between the light source 51 and the polygonal mirror unit 60. The collimating lens 53 collimates the divergent beam emitted by the light source 51 into a parallel or convergent beam. The at least one cylindrical lens 55 focuses an incident beam differently onto the polygonal mirror 65 in the main scanning direction and subscanning direction.

Figure 8:
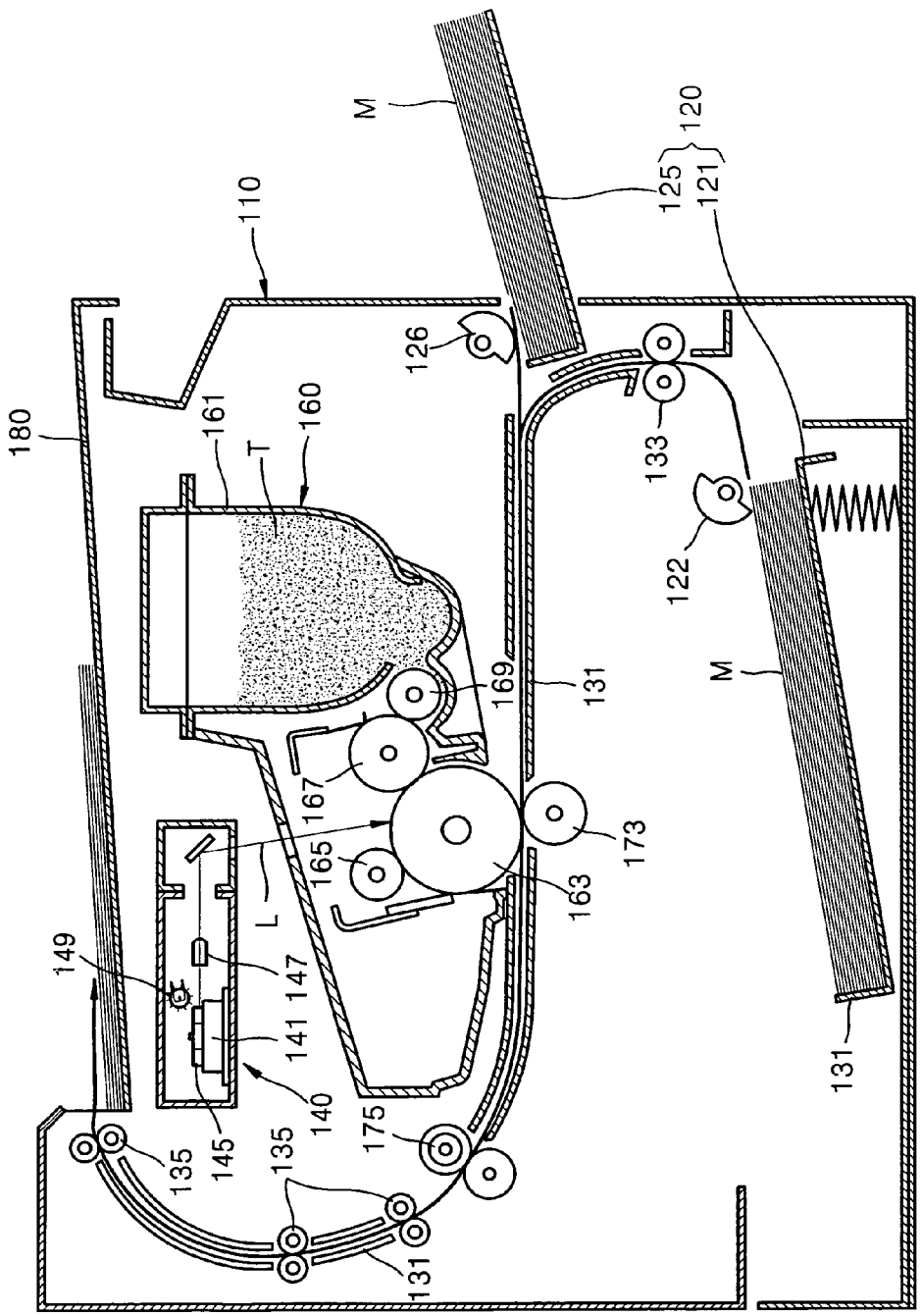
FIG. 8 is a schematic cross-sectional view of an image forming apparatus according to an embodiment of the present invention.

FIG. 8 is a schematic cross-sectional view of an image forming apparatus according to an embodiment of the present invention. Referring to FIG. 8, the image forming apparatus includes a cabinet 110, and a developing unit 160, a light scanning unit 140 that produces an electrostatic latent image, a transfer unit 173 that transfers the image formed by the developing unit 160 and a fusing unit 175 that fuses the transferred image on a print medium M housed within the cabinet 110.

An output tray 180 into which a printed medium M is loaded is located outside the cabinet 110 that determines the external appearance of the image forming apparatus. A feeding unit 120 receiving a stack of print media M to be fed to the developing unit 160 can be attached to or detached from the cabinet 110. The print medium M being fed through the feeding unit 120 is transported to the developing unit 160 through a transport path 131.

The feeding unit 120 includes a first feeder 121 for automatic feeding of the print medium M and a second feeder 125 for manual feeding. The first feeder 121 is disposed within the cabinet 110 and feeds the print medium M by the rotation of a first feeding roller 122 while the second feeder 125 is disposed outside the cabinet 110 and feeds the print medium M into the transport path 131 by the rotation of a second feeding roller 126.

The transport path 131 is disposed within the cabinet 110 and transports the print medium M supplied through the feeding unit 120 and includes a plurality of transport rollers 133 and 135. The transport path 131 has a feeding path, which is branched into two for separately supplying the print medium M through the first and second feeders 121 and 125.

The developing unit 160 includes a toner container 161 for holding predetermined colors of toners T and an image forming system for forming an image with the toner T supplied by the toner container 161. The image forming system includes a photoconductive medium 163 that responds to a beam L scanned by the light scanning unit 140, a charging device 165 that charges the photoconductive medium 163 to a predetermined potential, a developing roller 167 disposed opposite the photoconductive medium 163 and develops a region of the photoconductive medium 163 on which an electrostatic latent image is formed with the toner T, and a supply roller 169 that supplies the toner T to the developing roller 167.

The light scanning unit 140 scans a beam onto the photoconductive medium 163 in order to produce an electrostatic latent image on the photoconductive medium 163. The light scanning unit 140 includes the light source 51 as shown in FIG. 7, a polygonal mirror unit containing a driving source 141 and a polygonal mirror 145, and an f-θ lens 147. The polygonal mirror 145 comprises a main body with a plurality of reflective surfaces and photocatalytic layers that are formed on the plurality of reflective surfaces. The photocatalytic layers are activated by an incident beam of a predetermined wavelength to release reactive components to decompose organic materials. Thus, contamination of the reflective surface can be prevented by decomposing foreign materials on the reflective surface by the reactive components released from or produced by a photocatalyst when activated by a beam of incident light. When the photocatalytic layer is activated by a beam of a wavelength other than the beam emitted by the light source, the light scanning unit further includes an activation light source 149 disposed around the polygonal mirror 145.

Since the construction and principle of the operation of the light scanning unit 140 are substantially the same as those of the light scanning unit described with reference to FIG. 7, detailed descriptions thereof will not be given.

The transfer unit 173 is disposed opposite the photoconductive medium 163 with the print medium M being transported via the transport path 131 interposed therebetween and transfers the image formed on the photoconductive medium 163 to the print medium M. The image transferred onto the print medium M through the transfer unit 173 is fused through the fusing unit 175.

A polygonal mirror unit, a light scanning unit, and an image forming apparatus employing the same according to the present invention configured as described above makes it possible to actively prevent contamination on a reflective surface of a polygonal mirror by decomposing contaminants with a photocatalyst, thus significantly increasing the life span of the polygonal mirror. Furthermore, the present invention thoroughly solves problems with high manufacturing costs and complicated assembly manufacturing process.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A polygonal mirror adapted to prevent contamination of a reflective surface, the polygonal mirror comprising:
    a main body with a plurality of reflective surfaces; and
    a photocatalytic layer formed on the plurality of reflective surfaces, said photocatalytic layer being activated by an incident beam of a predetermined wavelength to decompose organic materials formed on said reflective surfaces.

2. The polygonal mirror of claim 1, wherein said photocatalytic layer releases free radicals upon exposure to said incident beam, and wherein said free radicals decompose said organic materials.

3. The polygonal mirror of claim 1, wherein the photocatalytic layer is made from a material that is activated by the incident beam of the predetermined wavelength to generate hydroxyl radicals (—OH).

4. The polygonal mirror of claim 2, wherein the photocatalytic layer is made from a metal oxide or a sulphur compound.

5. The polygonal mirror of claim 3, wherein the photocatalytic layer is made from a compound selected from the group consisting of $TiO_2$, $WO_2$, CdS, $SrTiO_2$, and $MoS_2$.

6. The polygonal mirror of claim 1, further comprising a corrosion preventive layer interposed between the main body and said photocatalytic layer to prevent corrosion of the main body.

7. A polygonal mirror unit designed to prevent contamination on a reflective surface on the polygonal mirror, the polygonal mirror unit comprising:
    a driving source; and
    a polygonal mirror coupled to and rotated by the driving source and deflects and scans an incident beam, the polygonal mirror including a main body with a plurality of reflective surfaces and a photocatalytic layer formed on the plurality of reflective surfaces, said photocatalytic layer being activated by an incident beam of a predetermined wavelength to decompose organic materials formed on said reflective surfaces.

8. The polygonal mirror of claim 7, wherein said photocatalytic layer releases free radicals upon exposure to said incident beam, and wherein said free radicals decompose said organic materials.

9. The polygonal mirror unit of claim 7, wherein the photocatalytic layer is made from a material that is activated by the incident beam of the predetermined wavelength to generate hydroxyl radicals (—OH).

10. The polygonal mirror unit of claim 9, wherein the photocatalytic layer is made from a metal oxide or a sulphur compound.

11. The polygonal mirror unit of claim 10, wherein the photocatalytic layer is made from a compound selected from the group consisting of $TiO_2$, $WO_2$, CdS, $SrTiO_2$, and $MoS_2$.

12. The polygonal mirror unit of claim 7, wherein the polygonal mirror further comprises a corrosion preventive layer interposed between the main body and said photocatalytic layer to prevent corrosion of the main body.

13. A light scanning unit comprising:
    a light source emitting a beam of a first wavelength;
    a driving device providing a rotational force; and
    a polygonal mirror that is coupled to and rotated by the driving device and deflects and scans said beam of the first wavelength emitted by the light source, the polygonal mirror including a main body with a plurality of reflective surfaces and a photocatalytic layer formed on the plurality of reflective surfaces, said photocatalytic layers being activated by an incident beam of a predetermined wavelength to decompose organic materials on said reflective surfaces.

14. A light scanning unit of claim 13, wherein said photocatalytic layer releases free radicals upon exposure to said incident beam in an amount to decompose contaminants on said reflective surfaces, and wherein said contaminants are formed from said organic materials.

15. The light scanning unit of claim 13, wherein the photocatalytic layer is made from a material that is activated by the incident beam of the predetermined wavelength to generate hydroxyl radicals (—OH).

16. The light scanning unit of claim 15, wherein photocatalytic layer is made from a metal oxide or a sulphur compound.

17. The light scanning unit of claim 16, wherein the photocatalytic layer is made from a compound selected from the group consisting of $TiO_2$, $WO_2$, CdS, $SrTiO_2$, and $MoS_2$.

18. The light scanning unit of claim 13, wherein the photocatalytic layer is made from a material that is activated by the beam of the first wavelength emitted by the light source.

19. The light scanning unit of claim 13, further comprising an activation light source emitting a beam of a second wavelength onto the reflective surface, wherein the first wavelength is different from the second wavelength;
    wherein the photocatalytic layer is made from a material that is activated by the beam of the second wavelength emitted by the activation light source.

20. The light scanning unit of claim 13, wherein the polygonal mirror further comprises a corrosion preventive layer that is interposed between the main body and said photocatalytic layer to prevent corrosion of the main body.

21. The light scanning unit of claim 13, further comprising an f-θ lens correcting said beam deflected by the polygonal mirror at different magnifications for main scanning direction and subscanning direction so that a corrected beam is focused onto an exposed object.

22. An image forming apparatus comprising:
    a developing unit;
    a light scanning unit including a light source emitting a beam of a first wavelength, a driving device providing a rotational force, and a polygonal mirror coupled to and rotated by the driving device and deflects and scans said beam of the first wavelength emitted by the light source, wherein the polygonal mirror comprises a main body with a plurality of reflective surfaces and a photocatalytic layer formed on the plurality of said reflective surfaces and are activated by an incident beam of a predetermined wavelength to decompose organic materials on said reflective surfaces;
    a transfer unit corresponding to the developing unit and transferring an image formed by the developing unit to a print medium; and
    a fusing unit fusing the transferred image on the print medium.

23. An image forming apparatus of claim 22, wherein said photocatalytic layer releases free radicals upon exposure to said beam of the first wavelength in an amount to decompose contaminants on said reflective surfaces, and wherein said contaminants are formed from said organic materials.

24. The apparatus of claim 22, wherein the photocatalytic layer is made from a material that is activated by the incident beam of the predetermined wavelength to generate hydroxyl radicals (—OH).

25. The apparatus of claim 24, wherein the photocatalytic layer is made from a metal oxide or a sulphur compound.

26. The apparatus of claim 25, wherein the photocatalytic layer is made from a compound selected from the group consisting of $TiO_2$, $WO_2$, $CdS$, $SrTiO_2$, and $MoS_2$.

27. The apparatus of claim 22, wherein the photocatalytic layer is made from a material that is activated by said beam of the first wavelength emitted by the light source.

28. The apparatus of claim 22, wherein the light scanning unit further comprises an activation light source emitting a beam of a second wavelength onto the reflective surfaces of said polygonal mirror, wherein the first wavelength is different from the second wavelength;

wherein the photocatalytic layer is made from a material that is activated by the beam of the second wavelength emitted by the activation light source.

29. The apparatus of claim 22, wherein the polygonal mirror further comprises a corrosion preventive layer interposed between the main body and said photocatalytic layer to prevent corrosion of the main body.

* * * * *